United States Patent [19]
Aujollet et al.

[11] Patent Number: 5,687,675
[45] Date of Patent: Nov. 18, 1997

[54] DEVICE FOR VAPORIZING THE DIPHASIC MIXTURE OF A COOLING CIRCUIT DURING A DEPRESSURIZING PROCEDURE

[75] Inventors: Patrick Aujollet, Pertuis; Patrice Clement, Saint Egreve, both of France

[73] Assignee: Commissariat a l'Energie Atomique, Paris, France

[21] Appl. No.: 576,137

[22] Filed: Dec. 21, 1995

[30] Foreign Application Priority Data

Jan. 18, 1995 [FR] France ................................. 95 00510

[51] Int. Cl.$^6$ ................................................. F22B 1/00
[52] U.S. Cl. ........................ 122/4 D; 122/32; 122/34
[58] Field of Search ........................ 122/4 D, 32, 34, 122/35, 36

[56] References Cited

FOREIGN PATENT DOCUMENTS

| | | |
|---|---|---|
| 0 026714 | 4/1981 | European Pat. Off. . |
| 0 578392 | 1/1994 | European Pat. Off. . |
| 1 162707 | 8/1969 | United Kingdom . |

Primary Examiner—Henry A. Bennett
Assistant Examiner—Gregory Wilson
Attorney, Agent, or Firm—Oblon, Spivak, McClelland, Maier & Neustadt, P.C.

[57] ABSTRACT

Vaporizing device connected to a cooling circuit. In particular, it includes a receptacle (28) traversed by heat exchange tubes (26) which unite two pipes connected to a hot branch (3) and a cold branch (4) of the circuit. A vapor reject pipe (10) is open to engage vaporization; the circulation of hot water in the heat exchange tubes (26) drives vaporization of the liquid contained in the receptacle (28) whose feeding with liquid is ensured by a pipe (23) linked to the pipe (21) and comprising a stop valve (24) and a flow reducer (25).

5 Claims, 3 Drawing Sheets

DEVICE FOR VAPORIZING THE DIPHASIC MIXTURE OF A COOLING CIRCUIT DURING A DEPRESSURIZING PROCEDURE

FIELD OF THE INVENTION

The present invention concerns a device for vaporizing a diphasic mixture of a cooling circuit during depressurizing operations.

More specifically, this device is able to maintain a vapor flow at the outlet of the device throughout a programmed depressurization operation.

So as to illustrate the use of this device, it is integrated with the primary cooling circuit of an under pressure water reactor (PWR).

BACKGROUND OF THE INVENTION

At the current moment, the programmed depressurization of the primary circuit of a pressurized water reactor is carried out with the aid of a discharge device connected to the top of the pressurizer.

This primary circuit of a PWR shown on FIG. 1 mainly includes:

a tank 1 containing the nuclear core which heats the water to a high temperature (~320° C.) and which therefore constitutes the hot source of the reactor. The circulation of this water heated in the tank 1 towards the vapor generator 2 constituting the cold source is carried out by a pipe 3 known as a <<hot branch>>. At the outlet of the vapor generator, the partially cooled water is sent towards the tank by a pump 5 by means of a pipe 4 known as a <<cold branch>>. The <<hot branch>> 3 of the primary circuit is connected by a derivation pipe 7 to a pressurizer 6, a long tank in which the water is partially vaporized by means of an electric resistor 8 until the vapor contained in the upper portion reaches the sought-after pressure (~155 bars). When it is desired to reduce the pressure, a shower 15 fed with cooler water by a pipe 9 connected to the <<cold branch>> makes it possible to gradually condense the vapor.

The operations for depressurizing this primary circuit are carried out with the aid of the discharge device 16 connected to the upper portion of the pressurizer and which is mainly made up of a discharge valve 11 connected to the pressurizer 6 by the pipe 10 and to the reject tank 14 by the pipe 17, as well as a safety valve 12 connected directly to the reject tank 14 by the pipe 13.

This safety valve opens automatically if there is any abnormal excess pressure of the primary circuit.

To carry out a programmed depressurization, the discharge valve 11 is triggered to open.

But throughout this depressurizing operation, it is essential to provide in the primary circuit a sufficient flow of cooling fluid so as to maintain a continuous cooling of the hot source.

Now the pressurizer itself alone is inadequate to fulfill this function. In fact, as soon as the vapor volume (limited) of the dome of the pressurizer has been evacuated to the reject tank 14, the pressurizer is entirely filled with a liquid and vapor mixture which flows towards the tank 14; this results in a significant rejection of the liquid phase primary fluid which shall fail in cooling the core of the reactor.

The device of the invention is able to resolve this problem by vaporizing the primary water and using all the latent vaporization heat of the bulk of fluid released so as to help in cooling the hot source.

This device connected to an under pressure liquid cooling circuit includes a receptacle connected to a first point of the circuit by a first pipe and to a second point of the circuit, colder than the first one, by a second pipe, these pipes being connected by heat exchange tubes situated in a lower portion of the receptacle, an additional pipe connecting the inside of the receptacle to the second pipe, the additional pipe being fitted with a stop valve and a flow reducing device, a vapor rejection pipe opening into the upper portion of the receptacle.

The second pipe is preferably at least vertical and descending from the receptacle to the circuit so that a natural circulation is established in the first pipe, the heat exchange tubes and the second pipe; this effect may be reinforced by a cooling device installed on the second pipe.

BRIEF DESCRIPTION OF THE DRAWINGS

The invention is now described in more detail with the aid of the following figures given by way of illustration.

DETAILED DESCRIPTION OF THE PREFERRED EMBODIMENTS

Figure 1:
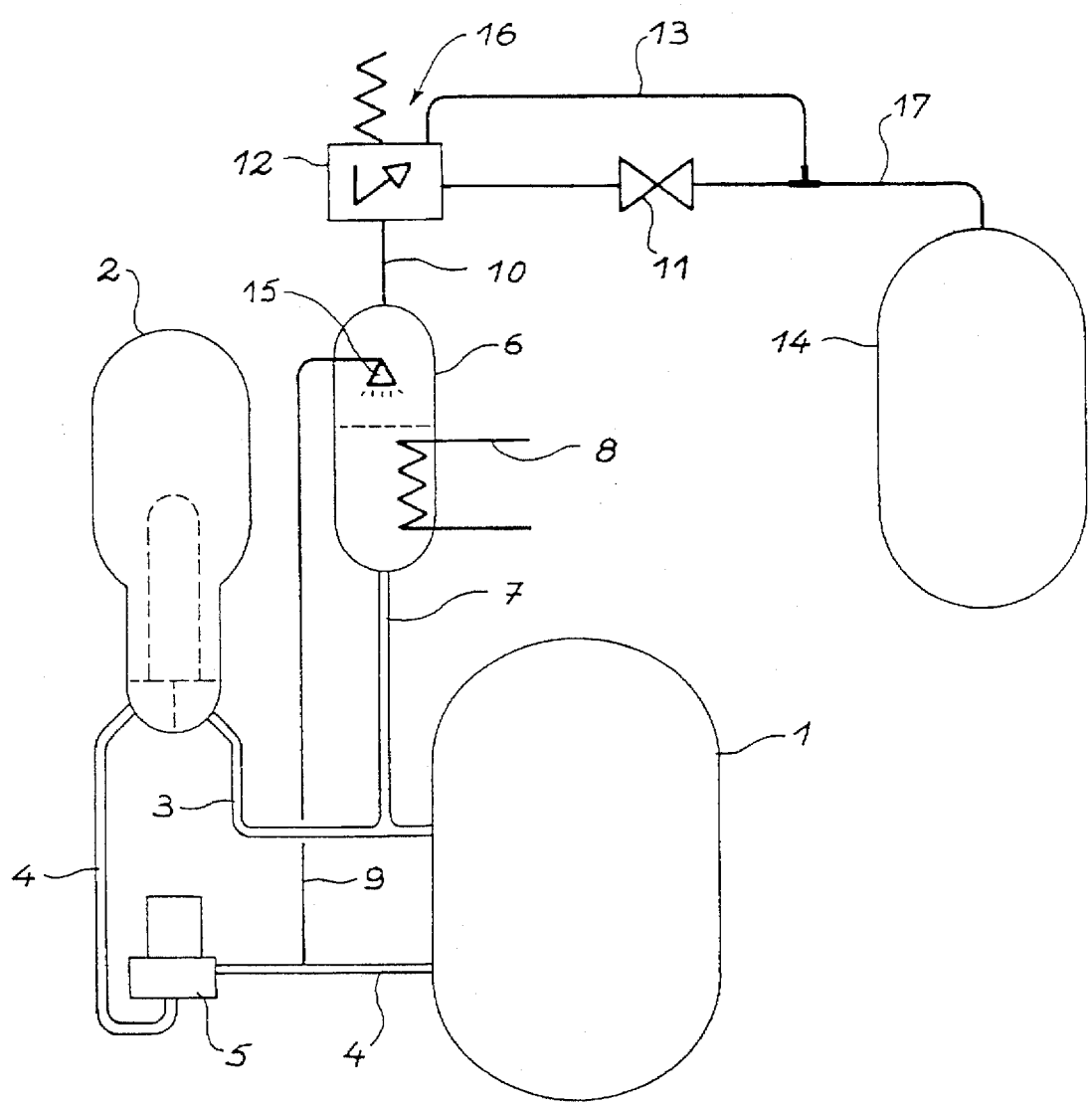
FIG. 1, already described, represents an under pressure water reactor primary circuit.
Figure 2:
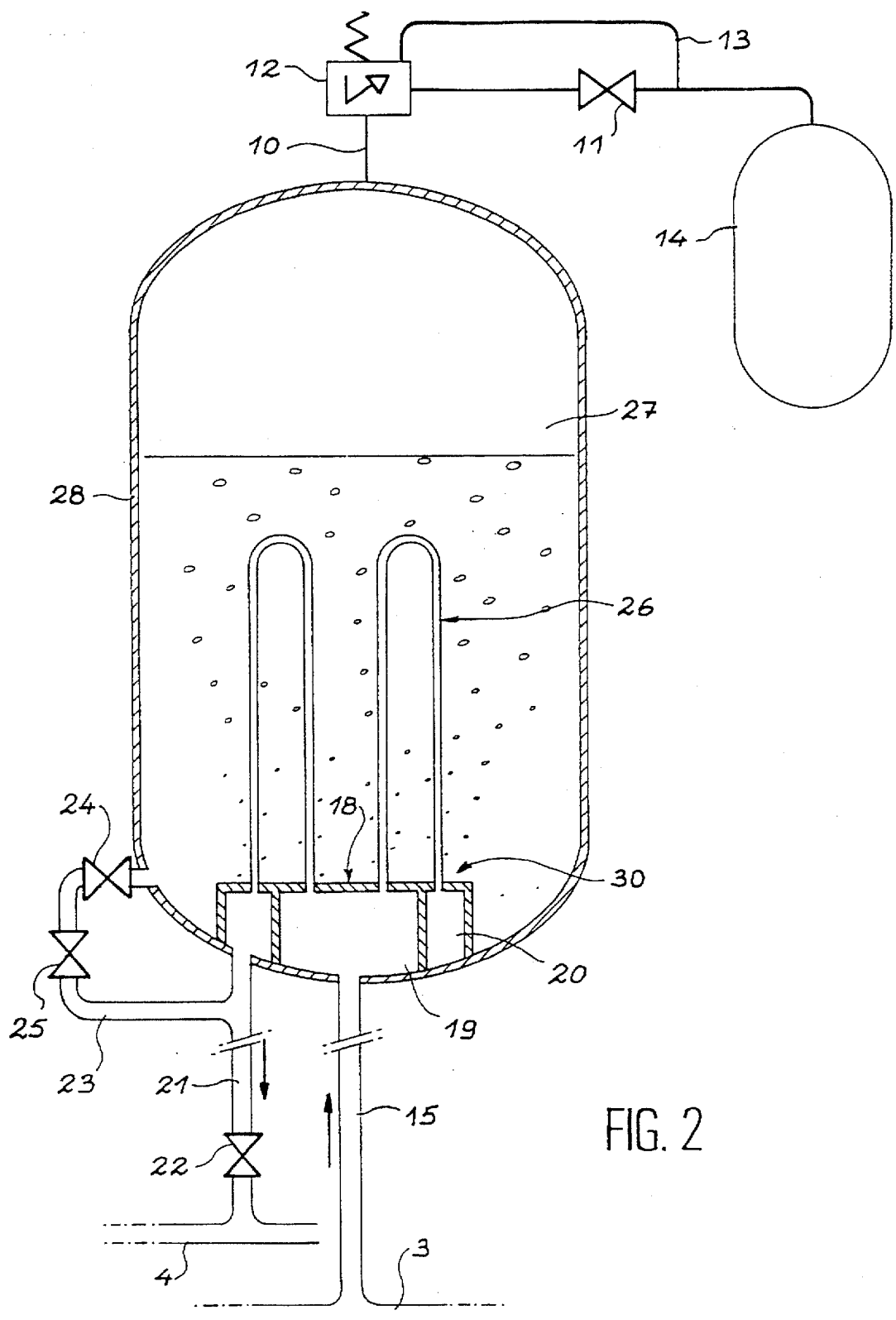
FIG. 2 represents the invention.
Figure 3:
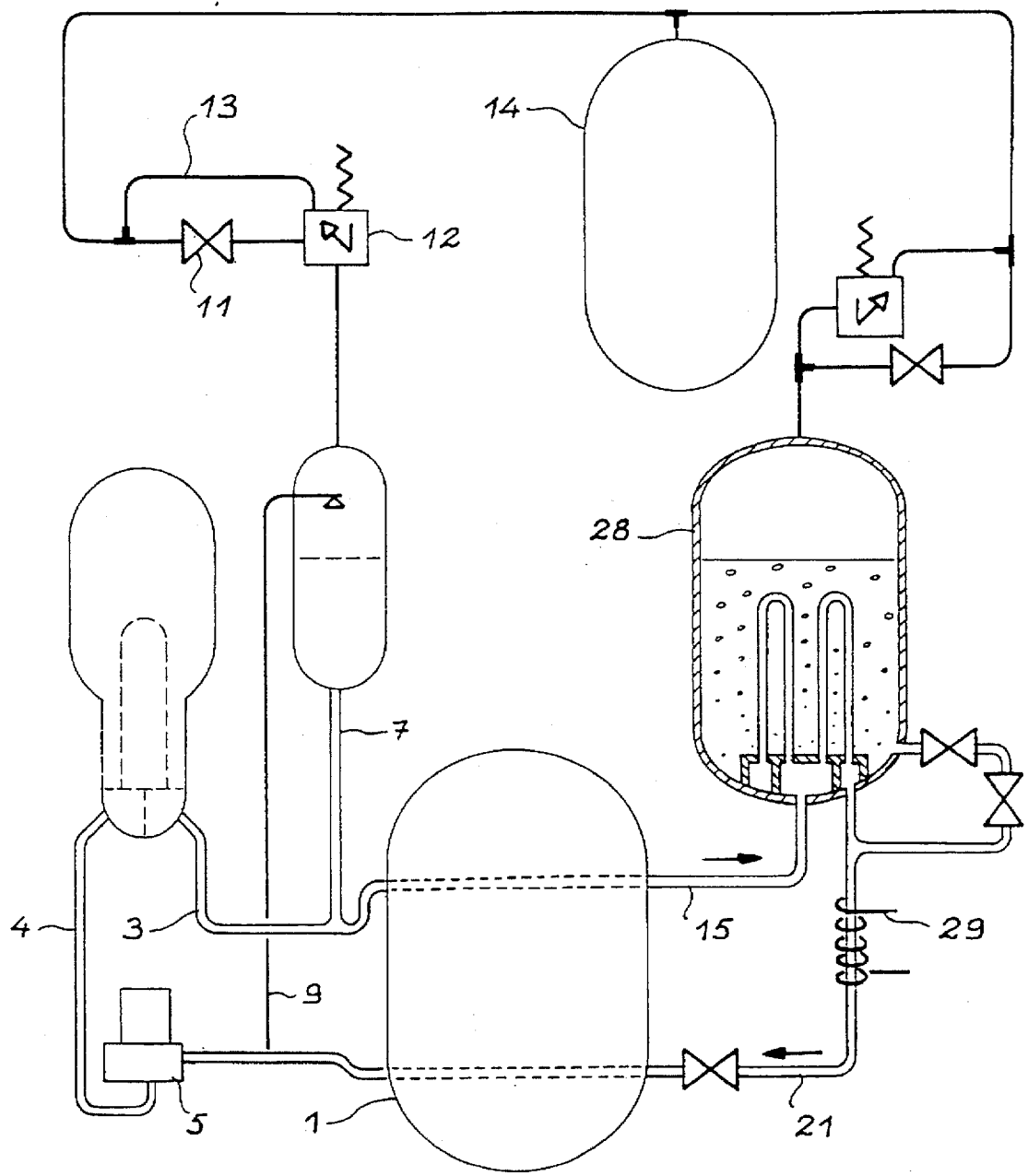
FIG. 3 represents a possible implantation of the invention on the circuit of FIG. 1.

The vaporization device of the invention shown on FIG. 2 includes:

a closed receptacle 28 comprising in its lower portion two chambers 19, 20, namely respectively the primary water intake and outlet chambers and called water boxes. On FIG. 2, the two water boxes are concentric, but may have other shapes, like for example the water boxes of the vapor generator 2 of FIG. 1, these boxes being formed by the bottom of the receptacle, the tubular plate and a median separation partition.

These two water boxes are interconnected by a bundle of heat exchanger tubes 26 situated inside the receptacle 28. Feeding with primary water of the intake water box is effected with the aid of a pipe 15 preferably connected to the hot branch 3; and the return of the primary water is effected with the aid of a vertical pipe 21 preferably connected to the cold branch 4 of the primary circuit. The circulation of primary water through the heat exchanger tubes may be a forced circulation with the aid of a pump, for example, installed on one of the pipes 15 or 21; or a circulation by natural convection favored by the elongation of the heat exchanger tubes 26 and/or the vertical pipe 21 whose water column needs to be as heavy as possible. An additional cooling of this water column may be effected with the aid of a heat exchanger 29.

The most innovating portion is constituted by the device for feeding the receptacle 28 with fluid from a branch-T on the cold outlet pipe 21 or directly on the water outlet box. This device is formed of a pipe 23 connecting the cold outlet circuit to the receptacle 28 and comprising a stop valve 24 and essentially a flow reducer 25 (for example, an adjustment valve or a calibrated orifice).

The upper portion of the receptacle 28 is equipped with a discharge system identical to that of the pressurizer described earlier.

Prior to any programmed depressurizing operation, the receptacle 28 is partly filled with primary water 30 surmounted by a dome 27 of vapor or gas under pressure. The valves 22 in a closed position prevents the circulation of primary water in the exchanger tubes 26. The stop valve 11 of the discharge circuit and the stop valve 24 of the device for feeding the receptacle with fluid are closed.

The depressurization operation is carried out as follows:

The valve 11 of the discharge circuit is open at the same time as the stop valve 22. The pressure instantly goes down in the receptacle 28 since one portion of the gas or vapor is ejected from the top of the receptacle towards the discharge system. The primary fluid begins to circulate from the hot branch 3 through the heat exchanger made up of the portions 19, 20 and 26 transferring its heat through the wall of the tubes 26 to the colder fluid contained in the receptacle 28. The combined effect of this heating and the lowering of pressure in the receptacle 28 will make it possible to reach the saturation conditions in the fluid 20 which shall begin to boil, the vapor produced escaping through the discharge system 10, whilst liquid shall remain at the bottom of the receptacle 28. The feeding of the receptacle 28 with liquid is ensured by the opening of the valve 24 situated on the pipe 23.

The water flow arriving from the pipes 26 is divided between the feeding controlled by the valve 25 of the receptacle 28 and the return towards the cold branch 4 via the pipe 21. The regulator 25 of the feed flow of the receptacle 28 makes it possible to maintain a sufficient level so that the exchanger tubes become submerged but without permitting the full filling of the receptacle 28 so that a sufficient vapor volume is maintained between the water level in the receptacle 28 and the discharge system 10.

During pressurization, all the liquid circulating in the pipe 15 from the hot branch shall not enter the pipe 23: one portion of this cooled liquid in the tubes 26 shall return to the cold branch. The natural circulation loop closes again on the tank 1, this loop then contributing in cooling of the hot source.

So as to stop depressurization, it merely suffices to reclose the valve 11 of the discharge circuit and the stop valves 24 and 22.

What is claimed is:

1. Vaporization device connected to a cooling circuit, wherein it includes a receptacle connected to a first point of the circuit by a first pipe and to a second point of the circuit, colder than the first one, by a second pipe, the pipes being connected by heat exchange tubes situated in a lower portion of the receptacle, an additional pipe connecting the inside of the receptacle to the second pipe, said additional pipe being fitted with a stop valve and a flow regulating device, a vapor rejection pipe opening into the upper portion of the receptacle.

2. Vaporization device according to claim 1, wherein at least the second pipe is vertical and descending from the receptacle to the circuit so that a natural circulation is established in the first pipe, the heat exchange tubes and the second pipe.

3. Vaporization device according to claim 2, wherein a cooling device installed on the second pipe.

4. Vaporization device according to claim 1, wherein the flow regulating device is an adjustment valve.

5. Vaporization device according to claim 1, wherein the flow regulating device is a calibrated orifice.

* * * * *